United States Patent [19]
Hansch et al.

[11] 3,781,700
[45] Dec. 25, 1973

[54] OPTICAL ELEMENT SYSTEM AND METHOD FOR AMPLIFYING IMAGE FORMING LIGHT RAYS

[75] Inventors: Theodor W. Hansch; Frank L. Varsanyi, both of Palo Alto, Calif.

[73] Assignee: The Board of Trustees of the Leland Stanford Junior University, Palo Alto, Calif.

[22] Filed: Feb. 11, 1971

[21] Appl. No.: 114,470

[52] U.S. Cl................ 330/4.3, 350/160, 250/199, 331/94.5 A
[51] Int. Cl............................... H01s 3/10
[58] Field of Search.............. 330/4.3, 4.6; 350/160; 250/199; 331/94.5 A

[56] References Cited
UNITED STATES PATENTS

| | | | |
|---|---|---|---|
| 3,273,072 | 9/1966 | Korster et al. | 330/4.3 |
| 3,452,286 | 6/1969 | Adler | 331/94.5 A |
| 3,445,826 | 5/1969 | Myers | 331/94.5 A |
| 3,521,187 | 7/1970 | Snavely et al. | 330/4.3 |

OTHER PUBLICATIONS

Shank, "Single Pass Gain of Rhodamine 6 & Dyechosecomp" 10/1/70, pg. 307–309, Apl. Vol. 17, No. 7.

Hansch, "Laser Octave of Dyes, Gelatin", 1/71, pg. 45–46, 1 Rev., S & B

*Primary Examiner*—Benjamin A. Borchelt
*Assistant Examiner*—N. Moskowitz
*Attorney*—Flehr, Hohbach, Test Albritton & Herbert

[57] ABSTRACT

An optical element system and method for amplifying light rays such that a typical plane in object space can be transferred and amplified as an image on a screen and image space using an organic dye media disposed in the path of the amplifying rays and excited by light pulses of having predetermined characteristics. Uses suggest themselves in widely varying field of infrared, ultraviolet and visible optical instruments and computers and other devices.

17 Claims, 5 Drawing Figures

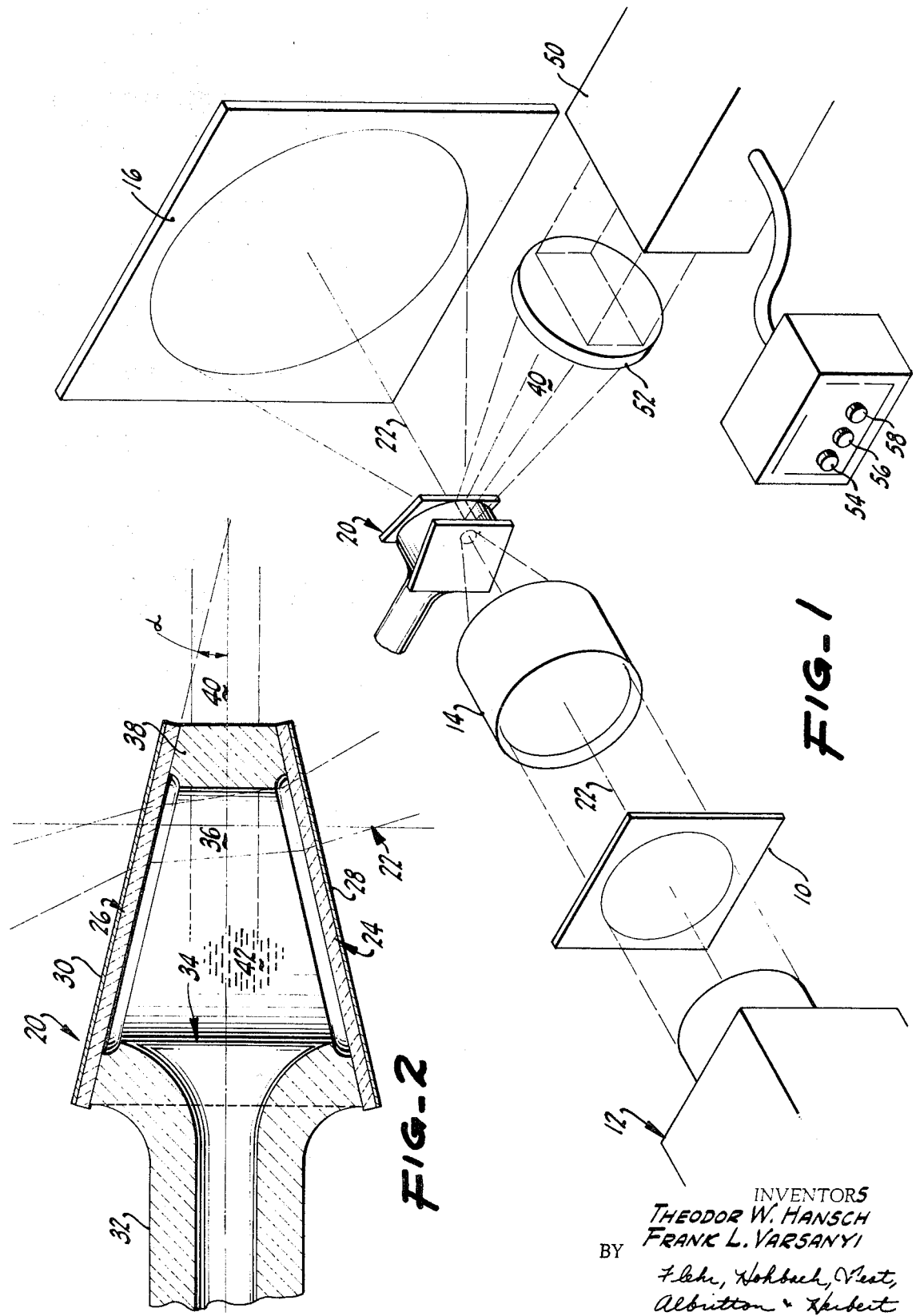

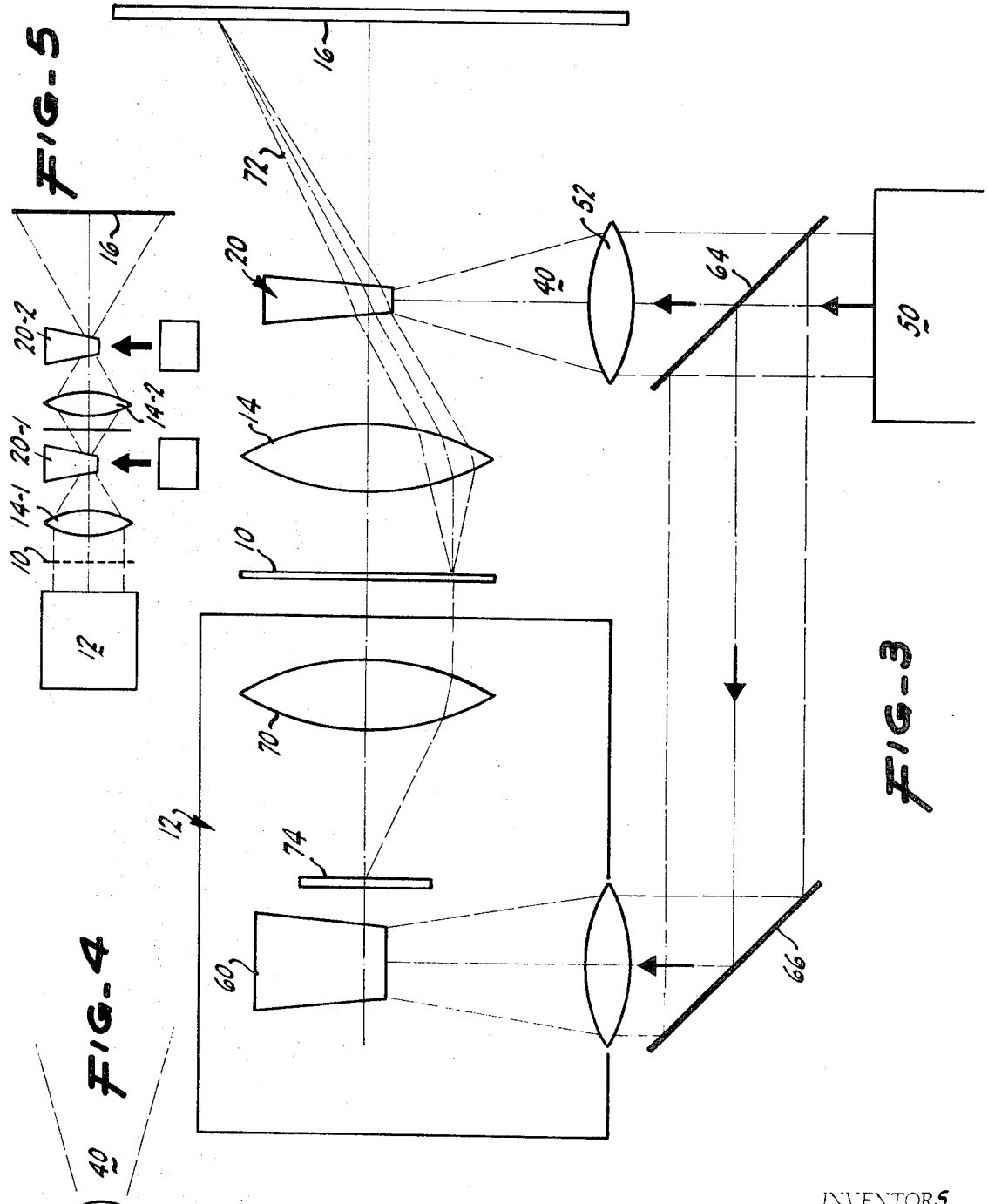

OPTICAL ELEMENT SYSTEM AND METHOD FOR AMPLIFYING IMAGE FORMING LIGHT RAYS

BACKGROUND OF THE INVENTION

This invention relates to optical elements systems, and method, for amplifying image forming light rays and more particularly to such an element using a dye capable of single path amplification of image rays by a stimulated emission.

Heretofore image amplifiers have often used photocathodes for emitting an electron beam pattern which can be accelerated by suitable fields to higher energies to form a more intense image on a phosphor screen. Such systems are limited in the amount of illumination they can provide by the capacity of the phosphor. They also have unavoidable persistence due to the light emitting life time of the phosphor.

Other image amplifiers have been disclosed in the prior art usch as that in U.S. Pat. No. 3,452,286 to Adler and also that disclosed in the *Bell System Technical Journal* 41, 1371 (1962) entitled "A Unidirectional Traveling Wave Optical Maser," by Geusic & Scovil. Such instruments are limited in general by small gain per unit length of amplifying media, a low angular acceptance, and are inherently narrow band because of their working on atomic resonance line transition.

In systems such as is disclosed in Adler, U.S. Pat. No. 3,452,286 laser type optical cavities have also had to be used in order to obtain useful gain from such devices and this gives rise to significance to often undesirable changes in contrast, phase coherency, resolution and quality of the resultant image that can be obtained. Also, use of such laser cavities and materials disclosed in the prior art are often bound up with inherent low efficiencies (of the order of 1/10 percent) available by the specific laser medium so that significant input powers would be required to obtain even low power output from the device. And such prior laser systems had to use relatively long lengths of media to obtain significant amplification. This leads to geometrical difficulties or restrictions in the angular acceptance angles of such devices and renders them somewhat unsuitable for use with conventional optical systems. In general, therefore there is a need for a new and improved optical element system for the amplification of image forming light rays.

OBJECTS AND SUMMARY OF THE INVENTION

In general it is an object of the present invention to provide new and improved optical element, system, and method for amplifying image forming light rays which will overcome the above disadvantages by using a dye laser medium arranged so that it operated so that one adequate amplification is obtained without distortion in a single pass of a bundle of image rays so that optical cavities and resonators are therefore not required.

Another object of the invention is to provide an optical element, system, and method of the above character capable of high power amplification, broad bandwidth, capability of full color operation and maintenance of contrast information as well as generally high optical quality and high operating efficiencies.

Another object of the invention is to provide an optical element, system, and method of the above character inherently capable of high angular acceptance angles so that it is highly adapted for use as an auxilary device in conventional optical systems.

Another object of the invention is to provide an optical element, system, and method of the above character having extremely fast time response.

Another object of the invention is to provide an optical element and system of the above character capable of utilizing a wide variety of readily available organic dyes is various physical forms as an active media.

The present invention resulted from the discovery that when an active laser dye media in a non-regenerative configuration is pumped with light pulses of particular characteristics the media is capable of extraordinarily high gain and exceptional optical quality as well as broad band output of operation. Normally, one would expect thermal effects, Schlieren and other nonhomogeneous effects to render such a media impossible to operate for image amplification purposes.

The optical element system and method of the present invention generally is adapted to amplify a light ray received from an element of object space having a predetermined color content in the visible, infrared, or ultraviolet portion of the spectrum and to transfer and project said ray into a well-defined position of an image space. The element consists of a media disposed in a dye cell having a non-regenerative configuration and arranged in the light path of the ray for amplifying the same as it passes therethrough. Means are provided for exciting the dye media with light in the ultraviolet, visible, or infrared in pulses having a pulse repetition rate such that the dye media returns to an equilibrium state between each pulse to thereby avoid using the media during time intervals having nonhomogeneous effects. Preferably, the pulse length is less than that which would excite a substantial population of triplet states in the media and thereby cause depletion of singlet state excited species and additional losses due to their absorption. And, the pulse duration is also sufficiently short that the media remains substantially homogeneous with undegraded optical quality during this short period. In addition, movement of the media may be used in conjunction with control of the pulse repetition rate to permit faster rates to be used.

These and other objects and features of the invention will become apparent from the following detailed description and claims thereof when taken in conjunction with the accompanying drawings. In connection with the description of the present invention the terms optical and light will be used interchangeably and will serve, unless otherwise designated, to encompass not only the visible region of the spectrum but also those portions of the infrared and ultraviolet portions of the spectra to which the present invention is applicable.

DESCRIPTION OF THE DRAWINGS

FIG. 1 is a perspective view of an optical element and system constructed in accordance with the present invention.

FIG. 2 is a cross-section view of the optical element of the present invention taken along the lines 2—2 of FIG. 1.

FIG. 3 is a schematic view of an experimental arrangement of the present invention using a synchronously pulsed light source.

FIG. 4 is a front elevational view of an optical element modified and constructed in accordance with the present invention.

FIG. 5 is a further modification of the system of the present invention using multiple stages of amplification and selective filtering to reduce background noise.

DETAILED DESCRIPTION OF THE PREFERRED EMBODIMENTS

Referring now to FIGS. 1 and 2 there is shown an optical element and system constructed in accordance with the present invention and includes an extended object, as for example, a positive transparency slide 10 mounted for illumination as by a suitable lamp and condenser means generally indicated at 12. A projecting lens 14 serves to image this slide onto a screen 16 arranged at an appropriate imaging distance along an optical axis on which the foregoing elements are arranged. It will be assumed that the light intensity of the image on the object is such that significant amplification is desirable.

An optical amplifying element or dye cell 20 constructed and operated in accordance with the present invention is interposed between the slide 10 and the screen 16 preferably at or near the aperture stop of the lens or at an image thereof located where the rays being focused on the screen converge and cross the optical axis 22 of the system.

The amplifying element of the present invention can be constructed in various physical forms and embodiments of which the following dye cell is a specific example. Other examples will be hereinafter discussed. Thus, the dye cell of FIGS. 1 and 2 includes side windows 24, 26 consisting of spaced flat transparent plates made for example of optical quality glass and having suitable antireflection coatings 28, 30 thereon for minimizing internal reflections within the cell. The plates are mounted so that their interior surfaces form a wedge at the angle $2\alpha$ diverging slightly from each other to thereby cause any internal reflections to be misaligned and therefore travel away from the point of their origin in an active volume 32 about axis 22.

Means are provided for maintaining the plates in this position and for providing an enclosed volume and consists of a suitable peripheral wall 34 which is constructed of a section of cylindrical galss tubing to which the plates are joined by a suitable adhesive cement. The transverse angle of cut of the cylindrical tubing is made to provide the necessary divergence of window mounting. Access for filling the cell is provided through a glass tube and stopper not shown connected through a side of the peripheral wall 34.

The amount of divergence depends somewhat upon the size of the aperture. Small apertures require less divergence since rays associated with unwanted self oscillation pass out of the active volume after fewer reflections. Since the divergence of the windows and all contents will produce a slight prism effect and consequent image shift, it may be desirable in some applications to introduce a compensating prism (not shown) in series with and immediately following the amplifying element.

The cell is arranged so that the side walls are generally transverse to the optical axis 22 of the system and is positioned to encompass the region of the aperture stop on axis 22 within the active volume 32. At least that portion 38 of 3 peripheral wall 34 is made of suitable material transparent to the side excitation by the pump radiation beam 40 for the configuration shown in FIGS. 1 and 2.

The interior of the dye cell is filled with an organic dye 42 dissolved in a suitable carrier fluid having the property that when pumped by a light of a suitable nature the dye exhibits gain by the stimulated emission of radiation throughout a wide bandwidth characteristic of the dye. Such dyes are known in the art of dye lasers wherein they form the gain mechanism of a laser system usually incorporating frequency selective elements such as gratings, prisms and the like to define the output frequency. Many such suitable dyes exist and examples include solutions of rhodamine 6G (R-6G), rhodamine B (R-B) and fluorescein disodium salt (F) in a carrier fluid such as an alcohol, specifically ethanol. Other examples will be given hereinafter.

Means are provided for exciting said dye cell and consists of a suitable pulsed light source having an output focused into the active volume 32 of the cell. Preferably, for organic dyes presently available and for the required pulse strength, repetition rates, and pulse lengths, a pulse type laser 50 is a preferred form of exciting light sources. Such a laser pulse source commonly has an output in the form of a collimated beam which is focused into the active volume of the cell by suitable lens 52. Laser 50 is provided with controls 54, 56, 58 for varying the pulse strength, pulse length, and pulse repetition rate of its output beam 40.

As shown, the laser pulses are directed into the side of the cell through window portion 38 and create the active volume 32 by exciting dye molecules excited states from which decay is possible accompanied by light emission over a broad spectral range. The small angular divergence or misalignment of the side walls ($2\alpha$) prevents undesired self oscillation (lasing). As the image rays from projection lens 14 pass transversely of the exciting pulses and through active volume 32 they cause stimulated emission in accordance with their frequency content so that each ray is built up in strength at its particular frequency during the pass. Since each ray makes only a single pass through the system and also because of the divergence of the cell walls defeats self-oscillation, each ray passing through the active volume act in a distinct manner from the remaining rays so that the image projected by the lens is transferred to the screen essentially undistorted except for slight shifting due to the prism effect caused by the divergence of the side windows and the existence of an index refraction of the cell and contents.

Normally, it would be expected that excitation of the dye by the pulsed light source would cause local heating in volume 32 which in turn would produce Schlieren and other nonhomogeneous effects in the active volume. However, it has been discovered that by keeping the pulse length short and the rate of repetition of pulses adequately low it is possible to achieve essentially linear, high optical quality amplification by the cell before or after such effects can take place. For, by keeping the pulse repetition rate sufficiently low, or, in combination with circulation of the dye, the dye will return to equilibrium state of optical quality before the next pulse is applied.

The pulse strength and duration as well as repetition rate are factors which expectably vary depending upon the particular organic dye system chosen. Examples will be given for various dyes which have been experimentally tried. Values of these variables of applied pulses are found to lie within significantly useable ranges. For example, repetition rates between 16 and 24 pulses per second have been found satisfactory and conform to repetition rates bordering on an absence of flicker when viewed by persons of normal vision. Other repetition rates are expected to be useful where photographic or other means is used to record or otherwise sense information processed in accordance with the present invention. The pulse duration and strength are achieveable with commercial laser equipment.

In selecting suitable pulse lengths, criteria involves avoiding the population of long lived but slowly populated triplet states usually available in such organic dyes since these states, when populated, tend to reduce the population excited singlet species and interfere with the amplifying mechanism. Pulses satisfying this criteria can be summarized as being short compared to the build up time of the triplet state population. And, pulses must be short enough that insignificant degradation of optical quality within the active volume of the dye will have occurred during the application of the pulse.

As an example, satisfactroy results were obtained with $N_2$ gas laser used to excite each of the dyes mentioned above at 3,371 A in the ultraviolet with 10 nanosecond pulses at a repetition rate at about 20 pulses per second, pulse power 100 kilowatt.

While a laser exciting light source has been disclosed herein as a particularly suitable source, it should be understood that many sources will be found suitable so long as they satisfy the requirements of providing a suitably intense small spot of light within the active dye volume 32 having pulse characteristics satisfying the above criteria of duration and repetition rate.

A further feature of the invention results from using the amplifying dye media at the position of the aperature stop. Since all rays pass through all of the active volume, any diminution in gain caused by saturation from a particularly bright source affects all rays proportionately so that contrast differences are maintained. Also, differences in gain due to nonhomogeneous distribution of excited species are also balanced out since rays from all elements of the object pass through the entire active volume.

The following discussion reports the results of experiments made with the apparatus as shown in FIG. 3 in which two organic dye cells were used, and in which like parts have been given the same numbers as their counterparts in FIGS. 1 and 2, the second cell 60 served as a slide illumination light source and neither cell was part of or incorporated in an optical cavity. Each cell was filled with the same dye formula and carrier fluid during each experiment, the dyes being selected from R-6G, R-B, or F as previously identified. Excitation of illumination source cell was accomplished by a beam splitter 64 positioned in the path of the output of laser source 50 and a suitable redirecting mirror 66. Ambient light was excluded. Each cell was constructed with an active length of 1.3 mm and was made from pyrex tube sections of 10 mm diameter. The antireflection coated windows (24, 26) were sealed to the ends of each cell with a wedge angle ($\alpha$) of about 10° to avoid multiple reflections. Thus both were filled with the same dye solution and excited simultaneously by the same nitrogen laser. The UV pump laser output was focused by a spherical quartz lens 52 from the side into a line at the inner cell wall. The fluorescent glow of the source cell 60, showing a noticeable preference of near axial propagation, was collected by a field lens 70 and focused by the multi-element photographic lens 14 ($f= 55mm$) into the active volume of the amplifier cell 20. Here it was amplified in a single pass and emerged as a bright light cone 72 ($\approx 0.13$ sterad), illuminating a circular area on projection screen 16. The light distribution became somewhat more uniform with the use of diffusing ground glass plate 74 inserted between the source cell and the field lens. When any object, such as a wire mesh or a photographic transparency, was held into the object plane of the photographic lens, a bright projected image was formed on the screen despite the faint illumination of the object by the flourescent glow of the source cell.

For a quantitative determination of the single pass gain, various attenuators were inserted between oscillator and amplifier, and the output energy E per pulse, falling into the effective solid angle, was measured by the help of a calibrated photodiode. The gain was obtained by comparing the output without and with excitation of the amplifier. The absorption in the passive cell and the background $E_0$, i.e. the stimulated fluorescence of the amplifier alone, were taken into account as corrections. With R-6G and with excitation pulses of 100$\mu$J (microjoule) the background emission was about 4$\mu$J. At small signals ($E < 8\mu J$) a single pass gain of 1,000 × or 23 dB/mm was observed. At larger signals ($E \approx 25\mu J$) the gain dropped to 14 dB/mm indicating saturation. With R-B and F, the gain coefficients were about 4 dB/mm lower. Despite the saturation of the amplifying element the contrast of an optical image substantially maintained in a single pass, since a larger fraction of the active volume is shared by light from different object points, so that saturation affects both intense and less intense rays alike.

With R-6G, most of the meitted light fell within a spectral range of 100 A, centered at $\approx 5,700$ A due to use of the spectrally limited source. A gain coefficient of 23 dB/mm at this wavelength corresponds to a fractional population density of the excited singlet of $N_s/N = 0.16$. We note, however, that the listed gain coefficients represent space and time averaged values. By projecting the amplifier cell itself onto a remote screen, the width and height of the optically pumped cross section was measured to be about 0.1 to 0.15 mm. The active volume was then in the order of only about $10^{-2}$ mm$^3$. The signal pulse width is reduced from 4 nano sec to 2.5 nano sec (full width at half maximum) at 14 dB/mm gain in R-6G, as measured with an ITT Planar Photodiode and a Tektronix 519 Oscilloscope.

To measure the image resolution a slide with a TV test pattern was inserted at the object plane, and the projection screen was replaced by a photographic plate. At pulse repetition rates below 5pps and careful adjustment, a resolution of up to 200 line pairs per 0.4 radian was obtained. This corresponds approximately to the diffraction limit of a 0.1 mm diameter circular aperture at the position of the amplifier. Keeping the pump energy density of several Joules/cm$^3$ in mind, this good image quality is somewhat surprising. One would expect considerable deterioration due to thermal prism and lens effects. Time resolved measurements revealed that a He-Ne laser probe beam, passing through the center or the periphery of the pumped liquid volume, actually is distorted and deflected, but with the maximum deflection (10 milliradian) occurring with a time delay of 2–10 milli sec after the absorption of the UV light. The mechanism of this delay is at present under investigation. The image quality begins to deteriorate at repetition rates above 20 pulses per second. A circulation of the liquid could avoid this. No distortion up to 100 pulses per second repetition rate but a lower gain were observed, when cooled $H_2O$ or $D_2O$ (with a detergent additive) was used as a solvent rather than ethanol.

As tested, the amplifier can distinguish about $4 \cdot 10^4$ diffraction limited spatial directions. Within the utilized spectral range of 100A of the experiment there are about $1.5 \cdot 10^5$ distinguishable light frequencies corresponding to a pulse width of 2.5 nano sec. Taking the two possible light polarizations into account, one can then arrive at a channel capacity of $1.2 \cdot 10^{10}$. A high gain quantum amplifier has a theoretical minimum noise corresponding to 1 photon per mode or channel at the reference numeral "10". With a gain of 30 dB, this yield $1.2 \cdot 10^{13}$ noise photons at the output or a minimum background of $E_0=4\mu J$. The experimental value is surprisingly close to this fundamental limit. If a wide spectral range or a fast time response are not required, the background emission can in principle be greatly reduced by spectral filtering, and single pass gain up to 80 dB without saturation by the noise appear possible in a three stage system. In the foregoing discussion, there has been disclosed a specific embodiment of the invention in connection with the use of a liquid filled dye cell containing uniform dispersion of the dye in a suitable carrier. It should be understood however, that the present invention is not limited to a dye cell of such a costruction. For example, it is possible to disperse many organic dyes having suitable gain characteristics in gels or even into solid plastics such as polymethylmethacrylate. Any such active dye medias are considered suitable for use in the present invention. In using such media, the principles of the present invention would still apply and it would be necessary to maintain a physical confirmation of the active media and its boundaries such that non-regenerative property was maintained.

Examples of suitable organic dyes include not only the xanthene dyes previously mentioned but also coumarin dyes such as 4-methyl umbelliferone. Also in liquid systems such organic dyes may be dispersed in many types of solvents including the alcohols such as methanol ethanol, propanol, and glycerin as well as water (deuterium) dioxide containing suitable dye dispersant such as detergent. Furthermore in connection with the use of gel dispersed organic dyes, reference is made to the article in *IEEE Journal of Quantum Electronics* January 1971, entitled "Laser Action of Dyes in Gelatin" by Hansch et al. at pages 45–46.

Suitable solid dispersing agents include polymethylmethacrylate and the clear epoxies. It should be pointed out that it is not necessary to be limited to the use of a single dispersed dye in a given media, formulated mixtures of several dyes may be blended to obtain a broader or more uniform spectral characteristic. And, chemical additives can be used in some cases to quench triplet states or to form new lasing exiplex compounds.

Many other pulse laser sources may be substituted for the nitgrogen laser disclosed in connection with the specific embodiment herein. Such would include neodydium yag lasers using a frequency doubled output, ruby using frequency doubled output, as well as the noble gas lasers (Xe, Ne, Ar, & Kr). Many other modifications and features of the cell of present invention will occur to those skilled in the art to which it pertains.

Although the present invention has been disclosed in connection with a pulsed laser source as an excitation means which is transversely or side directed into the dye cell it should be understood that it is possible to modify the invention so that the dye cell is excited colinearly or nearly colinearly so that the exciting light pulse may enter the cell at an angle to the optical axis and could even enter the cell through the windows through which the image rays themselves pass. If the angle is chosen to be sufficiently large, the resultant spot which could fall on the screen will be found to fall outside of its boundaries so that no difficulty will arise. If desired, spots caused by the pulse source could even be blocked, as with a UV filter.

Referring now to FIG. 4 there is shown a front view of an optical element of the present invention using three dye cells 20a, 20b, 20c arranged across the incoming path of the pulse 40. Each of these contains a different dye operating over complementary portions of the spectrum such that full color amplification can take place with dyes of more limited individual color responses. Each of dye cells 20a, 20b, 20c is arranged to be encompassed within the aperture stop which is otherwise blanked off to prevent transmission of unwanted rays.

Referring now to FIG. 5 there is shown another modification of the present invention using multiple stages so that the total amplification is divided amongst two or more cells whereby the slide or other object is illuminated by the source 12 and projected by projection lens 14-1 through an amplifying cell 20-1 excited in the manner previously described. In place of the screen there is inserted a second projection lens 14-2 having a suitable focal length and so disposed as to project the image of the object onto screen 16. The purposes of dividing the amplifying function among several elements include avoidance of too large a gain in a single cell because if the gain becomes excessively large, spontaneous emission of noise is itself amplified to such an extent that it tends to saturate the amplifier and diminish the gain available to the signal. Further, by subdividing the amplifying function among several cells in series it is possible to introduce pass band filters immediately after each of the amplifiers. In addition, the use of multiple stages as shown in FIG. 5 further permits maintenance of the angular acceptance angle despite the fact that the effective amplifying depth of the dye amplifier can be rather large, since the effect of length of a single angular acceptance of a single cell is small but the effective length of the entire system can be made large.

While not shown in the drawings, it is also possible to use several dye cells simultaneously as several stages transversely disposed across the aperture stop of the system similar to that shown in FIG. 4 but without the feature of using different dyes for operation over the color spectrum. Such an arrangement would permit utilization of spaced elements across the aperture stop and therefore serves to obtain in effect a large effective aperture while maintaining the active volume used for amplification relatively small. In this way, high active volume gains may be obtained with high numerical aperture and moderate pump energies.

Among the many novel and advantageous features of the invention disclosed herein, may be mentioned the degree to which the miniaturization of the functions provided by the invention is possible. Heretofore, relatively large optical instrumentalities have been required to accomplish even some of the functions to which the present invention is directed.

The present example which is about only 100 cubic millimeter in active volume was about 1 millimeter in length and 100 square millimeter in cross sections.

As shown, such small volumes and angular acceptance are compatible with existing optical equipment and greatly facilitate utilization of the present invention either in existing equipment or in compact newly designed equipment. In addition, a natural application of such compact devices is suggested in miniaturization of optical computers for the projection of microscopic images such as are used in microfilm projection systems and readers. Other applications include movie and slide projectors with potentially greatly reduced sizes of film frame, projection of holographic images, spectroscopy, and short time photography.

In connection with the foregoing, it will be noted that as compared with the conventional image intensifiers, both the color and the phase of light are preserved in the present invention together with amplitude and direction. This permits accurate hologram image amplification applications. In connection with ultra-fast photography and optical computer applications, the obviously very fast time response provided by the present invention will permit significant shortening of processing times in these applications. In addition, high output powers can be obtained and a time resolution down to sub-picoseconds appears feasible. The ability to read out optical information at relatively low intensities as disclosed herein and to use it at a much higher intensity level has a rather general appeal and image amplifiers of the present invention, in permitting this, should find applications in many fields such as spectroscopy, microscopy, holography, short time photography or Schileren optics and in large scale optical information processing, using optical computer memories. Accordingly, and in view of the foregoing enumeration of numerous modifications and adaptations and uses of the invention it will be understood that the invention herein is not to be taken as limited by the specific example given but is to be understood to be as broad as is encompassed within the scope of the accompanying claims.

We claim:

1. In an optical system for projecting amplified images of an object space, a projection lens for transferring light rays received from said object to an image space, light receiving means disposed in at least one image plane in said image space, a cell containing an organic dye for amplifying light received from said projection lens and for transferring said amplified rays into a well-defined position on said light receiving means, said cell being disposed in the path of said rays and adjacent to said lens, means for exciting said dye with light pulses having a duration sufficiently short compared to the build-up of any substantial amount of non-homogeneous effect in said dye during said pulse, said pulse serving to excite said dye to a state whereby each light ray is amplified by stimulated emission as it passes through said cell, said dye having a gain band width encompassing the frequency of said incoming light rays to be amplified and providing an amplified image which is projected onto said light receiving means in said image space.

2. An optical system as in claim 1 in which said dye cell is positioned substantially at the aperture stop of said projection lens whereby said substantially all rays projected by said lens from an element in object space fill the entire active volume of said dye at said stop.

3. An optical system as in claim 1 in which said dye cell contains at least two dyes having differing frequency responses for providing broad bandwidth of operation.

4. An optical system as in claim 3 in which said dyes are uniformly dispersed together in a common carrier.

5. An optical system as in claim 3 in which said dyes are positioned in mutually exclusive positions substantially within said aperture stop.

6. An optical system as in claim 1 in which light rays are received from a plurality of planes in object space and are transferred through said projection lens and optical element to a plurality of corresponding planes in image space to thereby create a three-dimensional image.

7. An optical element as in claim 1 wherein said dye cell includes a transparent walls containing said dye, said cell being constructed to eliminate regenerative reflections therein.

8. An optical element as in claim 7 wherein said cell in constructed with planar windows through which said rays pass, said windows being misaligned with respect to each other to prevent buildup of self-oscillation in said dye.

9. An optical element as in claim 1 wherein said dye is excited by laser pulses.

10. An optical element as in claim 1 wherein said pulses are introduced into said media generally transversely of the light ray bundle being amplified.

11. An optical system as in claim 1 in which said dye is selected from the group of xanthene dyes consisting of rhodamine 6C, rhodamine B and sodium fluorescein and of coumarin dyes including 4-methyl umbelliferone, dispersed in a liquid carrier solvent.

12. An optical element as in claim 1 in which liquid carrier solvent is selected from the group of alcohols including methanol, ethanol, propanol and blycerine; of water or deuterated water containing a dye dispersent detergent.

13. An optical element as in claim 1 in which said dye is dispersed in a gel.

14. An optical element as in claim 1 in which said dye is dispersed in a clear plastic.

15. An optical system for amplifying images from an illuminated object in object space, a first projection lens for transferring rays received from said object space into an image space, a second projection lens for receiving light from said first image space and for projecting the same into a second image space, first and second light amplifying cells containing organic dye for amplifying light received from each of said projection lenses, said first dye cell for amplifying light being positioned immediately following said first projection lens and said second optical element for amplifying light being positioned immediately following said second projection lens, each of said first and second optical elements for amplifying light comprising an optical element for amplifying light received from said projection lens, and serving to amplify light rays having the predetermined frequency content and for transferring and projecting said ray into a well-defined position in said image space, means for exciting each cell with light pulses having a duration sufficiently short compared to the buildup of any substantial amount of non-homogeneous effects in said media during said pulse, said pulses serving to excite said dye media to a state so that each light ray is amplified by stimulated emission as it passes through said media, said dye having a gain bandwidth encompassing the frequency of said incoming light ray to be amplified, the amplification of said light rays being divided between said amplifying cells while maintaining small active volume and large numerical aperture.

16. An optical method for amplifying light rays received from an element of object space and having a predetermined color content in the visible, infrared, or ultraviolet portion of the spectrum and for transferring and projecting said ray into a well-defined position in an image space, the steps of passing said rays through an organic dye to amplify the same as it passes therethrough, exciting said dye with light pulses, having a duration short compared to the buildup of any substantial optical non-homogeneous effects, said pulses serving to excite said dye media into a state whereby said light ray is amplified by stimulated emission from said media, said dye having a gain bandwidth encompassing the frequency of said incoming light rays.

17. An optical method as in claim 16 further including the steps of preventing any self-oscillation in said dye media.

* * * * *